Dec. 30, 1952     R. M. WATERS ET AL     2,623,544
AUTOMATIC SAMPLER
Filed Sept. 30, 1946     3 Sheets-Sheet 1
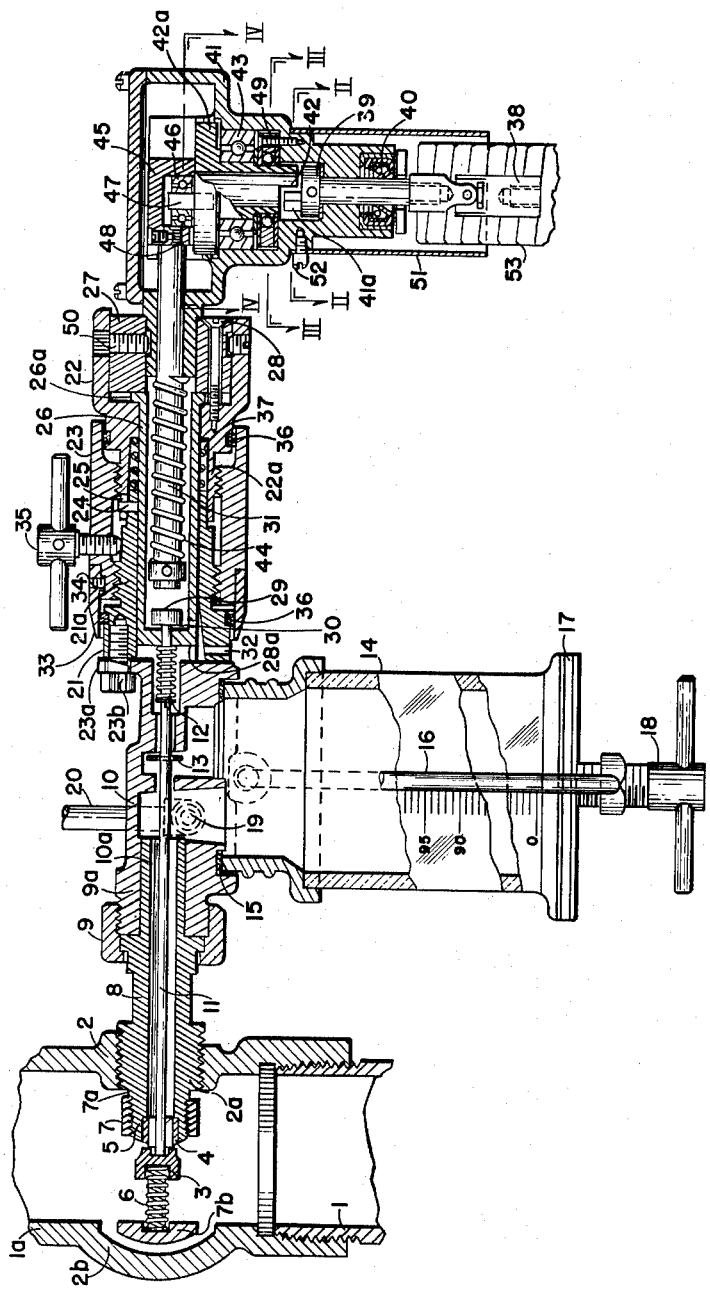
FIG. I
INVENTORS
RUSSELL M. WATERS
GEORGE E. BATCHELDER
BY *Strauch & Hoffman*
attorneys Dec. 30, 1952   R. M. WATERS ET AL   2,623,544
AUTOMATIC SAMPLER
Filed Sept. 30, 1946   3 Sheets-Sheet 2
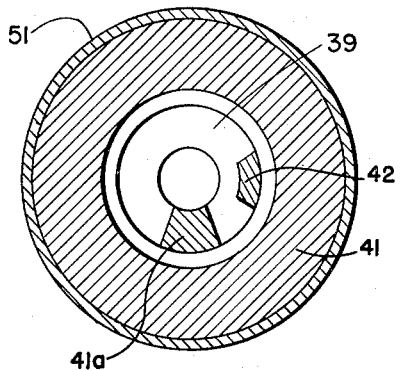
FIG. II
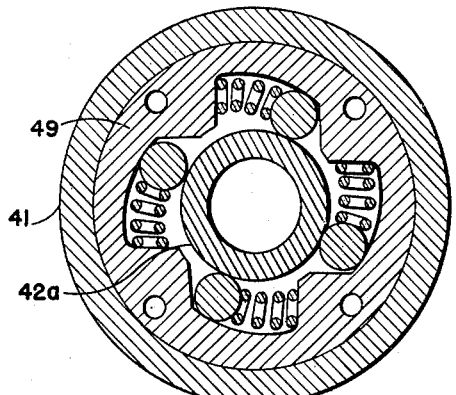
FIG. III
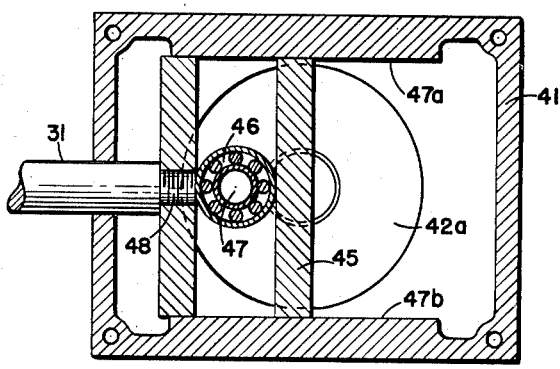
FIG. IV
INVENTORS
RUSSELL M. WATERS
GEORGE E. BATCHELDER
BY
*Strauch & Hoffman*
attorneys

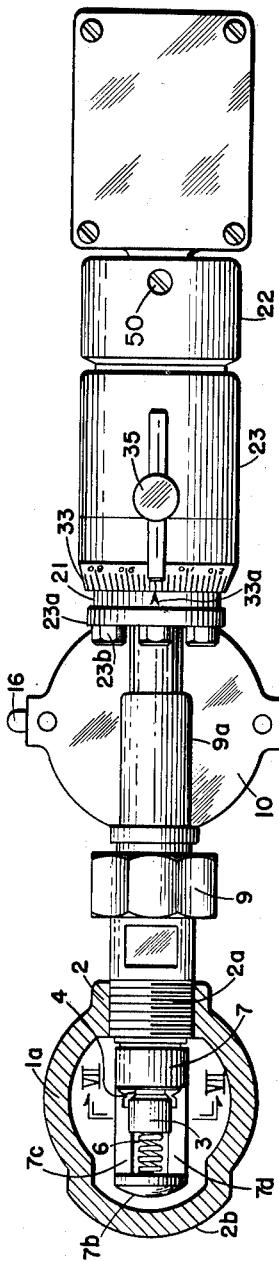
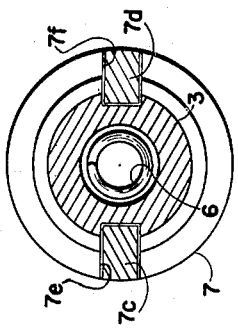
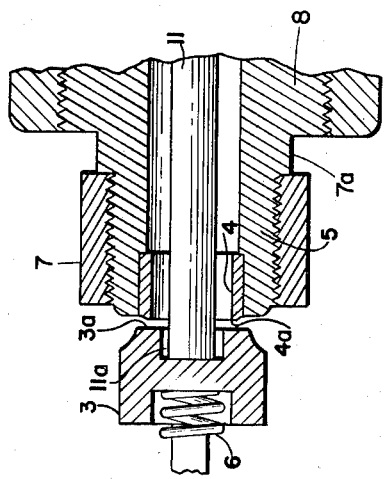

Patented Dec. 30, 1952

2,623,544

UNITED STATES PATENT OFFICE 2,623,544

AUTOMATIC SAMPLER

Russell M. Waters, Whittier, Calif., and George E. Batchelder, Pittsburgh, Pa., assignors to Rockwell Manufacturing Company, Pittsburgh, Pa., a corporation of Pennsylvania Application September 30, 1946, Serial No. 700,298

6 Claims. (Cl. 137—702)

The present invention concerns improved automatic apparatus designed to extract typical samples from a fluid in a flowing stream. More particularly the invention relates to means for procuring an average sample that is truly representative of the fluid sampled. A high degree of accuracy is especially important for oil producers, refinery and other industrial operators so that they may keep momentarily posted on the contents of the main conduits used in these operations.

It is well known that the most difficult solutions to sample accurately are those where the percent of adulteration is either very small or very large. If, for example, the liquid being pumped from an oil well consists of ninety-eight percent water and two percent oil, an error of one percent in the oil sampling would produce a sample indicating only fifty percent of the actual oil being produced. To minimize the chance for error it is therefore important that sampling apparatus should include adjustable means not only to control the frequency of sampling but also to vary the volume of the sample taken. Another cardinal feature of a sampler is to have some means to insure that the rate of sampling shall be proportional to the rate of flow of the fluid being sampled. Obviously serious discrepancies may result from uniformly periodic sampling of an irregularly flowing batch of heterogeneous liquid. This principle is particularly true in the event that any irregular solid particles are carried in suspension by the fluid. The accuracy of the sample also depends on the position in the flowing stream of the sampler inlet in relation to stratification, if any, of the liquid. Sluggish areas and eddies should be avoided, and the sampler mechanism must not seriously obstruct the flow of fluid in the conduit.

Early sampling methods consisted of simply bleeding small quantities of liquid from the conduit without special regard for the volume of the sample, the frequency of sampling, the position of the sample outlet or the rate of flow of the fluid being sampled. Improved samplers have been used which provide for some of these conditions. In an earlier invention, disclosed in Patent No. 2,272,313, the mechanism for actuating the opening of the sampler valve was installed within the fluid conduit vertically above but downstream from the sampler valve. It has been found that the obstruction to the fluid flow offered by this operating mechanism may produce sluggish areas and differences in velocity around the sampler valve with a consequent tendency toward stratification and lack of miscibility of the fluid to be sampled. In our copending application Serial No. 538,917, filed June 6, 1944, for "Sampler" we disclosed a sampler which is operated by a fluid meter or motor upstream of the point from which the sample is taken. It is the purpose of the present invention to control all of these varying factors and still use the flowing fluid as a source of motivation for the sampler unit, as by means of a power take off from a meter upstream of the sampler, as shown and disclosed in the aforesaid application.

A primary object of the present invention is to provide a sampling device that will extract from a flowing fluid a relatively small sample which will accurately represent the average composition of the fluid being sampled.

Another object is to provide a device to time the operation of a sampling apparatus so that the sample taken will be proportional to the rate of flow in the liquid in the conduit.

A further object of the invention is to provide a means for simple and accurate manual adjustment of a sampling mechanism to control the volume of the sample to be taken without interfering with the operation of the sampler.

Still another object is to place the inlet valve of a sampler in a flowing stream so as to admit a sample of the most representative portion of the moving fluid and yet cause no serious resistance to the flow of said fluid.

A further object of the invention is to provide an inlet valve operated by a snap action which will cause a maximum flow of the sampled fluid into the sampler receptacle during the interval that the valve is open.

And still another object of the invention is to provide, in a fluid sampling apparatus, a means whereby the time interval during which the sampler inlet valve remains open is constant and predeterminable.

Other objects will become apparent as the description proceeds in connection with the drawing.

The preferred installation of this sampling apparatus is in an unobstructed vertical riser piping above a meter so that passage through the meter and the rising conduit will cause maximum miscibility of the fluid to be sampled, as it passes the sampler valve. For the purpose of illustration, preferred embodiments of the invention are described herein, in connection with the drawings forming part of said disclosure, and wherein:

Figure I is a vertical longitudinal cross-section of the sampler unit.

Figure II is a horizontal cross-section substantially along line II—II of Figure I.

Figure III is a horizontal cross-section substantially along line III—III of Figure I.

Figure IV is a cross-section substantially along line IV—IV of Figure I.

Figure V is a top plan view, partly in section, of the apparatus shown in Figure I.

Figure VI is an enlarged view of the valve and seat shown in Figures I and V.

Figure VII is an enlarged sectional view taken substantially along line VII—VII of Figure V.

Referring to Figures I and IV there is shown a vertical riser piping 1 forming a part for a conduit above and connected to the outlet of a fluid meter, not shown. A vertical tubular casing 1a is threaded onto the piping 1 and is provided with a radially extending boss 2 which has a threaded radial opening therethrough to provide a fluid connection to the interior of the casing and to support the sampler valve assembly by means of a threaded portion 2a on the valve barrel 8 thereof. Diametrically opposite to the boss 2 the casing 1a has an outwardly extending enlargement 2b whereby the interior cross sectional area of the casing is increased in the region of the boss 2.

The valve assembly is screwed rigidly into the threaded portion of boss 2, which brings the movable valve disc 3 of the assembly nearly to the center of the casing 1a. The valve assembly includes the movable valve member 3 and a fixed seat member 4 which is pressed into the left end 5 of a tubular element forming a valve barrel 8. Said two valve members or elements 3 and 4 are made of extremely hard material such as hardened stainless steel, hard rubber, or the like, and are so placed that the valve has the motion of a poppet valve, with a flat surface 3a seating against a flat surface 4a on the valve seat. The two said valve members are carefully lapped together to form a positive closure. Valve 3 is held against its seat 4 by a spring 6 supported between valve 3 and a valve guide and support 7 which is screwed tightly against a shoulder 7a on the valve barrel 8. The guide and support 7 includes the portion which is screwed against shoulder 7a and a spring seating portion 7b spaced therefrom but connected thereto by spaced guide rods 7c and 7d. The valve 3 is provided with diametrically spaced grooves 7e and 7f as shown in Figure VII which engage the guide rods to support and guide the valve in its movements towards and away from its seat. In addition to spring 6, the line pressure tends to hold valve 3 against its seat. The valve barrel 8 is held firmly by a union nut 9 against a shoulder 9a of a sample jar cap casing 10. Said casing 10, valve barrel 8, and valve seat 4 have an aligned central bore 10a to permit the passage of valve rod 11 which is biased against a depression 11a in valve 3 by spring 12 so that the valve 3 supports and guides one end of rod 11. A soft washer 13 prevents the passage of fluid by capillary action along valve rod 11. The annular space around valve rod 11 and the central bore 10a in cover casing 10 allows the passage of the fluid sample into a sample jar 14 which is held firmly against a gasket 15 between it and the sample jar cap casing 10 by a stirrup assembly comprised of stirrup frame 16, bottom plate 17 and take-up screw 18. The sample jar cover casing 10 is vented to the atmosphere by a small orifice 19 connected by a small tubing 20 or the like to the atmosphere. Valve 3, valve seat 4, valve guide 7, spring 6 and valve rod 11 are made of non-corrosive material to resist any corrosive action of the sampled fluid. The sample jar 14 is marked with calibrated graduations so that the volume of the sample therein may be estimated by inspection.

The adjustment assembly now to be described is for the purpose of regulating the extent of the opening movement of valve 3. This assembly is made in the form of a coupling having a stationary front coupling member 21 with a right-hand screw thread 21a and an axially movable rear coupling member 22 with a left-hand screw thread 22a. These two said members are coupled by a sleeve 23 having threads cooperating with 21a and 22a and which on rotation either separates or draws them together. The front coupling member 21 is fastened to a vertical flange 23a on the sample jar cap casing 10 by cap screws 23b so that when the sleeve 23 is rotated the rear coupling member 22 moves toward or away from it. A pin 24 (Figure I) is fixed in the front coupling member 21 and rides in a slot 25 in the rear coupling member 22 to prevent the rear coupling from rotating with sleeve 23. A plunger tube 26 passing centrally through couplings 21 and 22 is held rigidly against the rear coupling member 22 by a bushing 27 engaging a radial flange 26a on the tube, and positioned in the end of rear coupling member 22 by screws, one shown at 28. The valve rod 11 passes through and is guided by an opening in the front end wall 28a of the plunger tube 26 and terminates with a hardened head 29 within the bore of plunger tube 26. The front end wall 28a with the opening therethrough forms a combined guide and stop means for the valve rod 11, as will become apparent. With the valve end of valve rod 11 resting against the depression 11a in the seated valve 3 the space 30 between the valve rod head 29 and the inner surface of the front end wall 28a of plunger tube 26 is the distance of travel of the rod hence the amount of opening of the valve 3 when the valve rod head 29 is impacted by a plunger or hammer 31. A light spring 12 is provided on valve rod 11 to keep it bearing with a slight pressure against the valve 3 so that the end of the valve rod 11 will remain seated in the annular recess 11a in said valve. A drain hole 32 is also provided in the bottom of the front coupling 21 to release any fluid that might have passed the soft washer 13. The amount of such fluid that might pass by said washer would be of minute quantity but precautions are taken to prevent possible corrosion within the adjustment assembly. An indicator ring 33 is fastened to the coupling sleeve 23 by set screws 34 bearing in a slot in the sleeve. This indicator ring 33 is marked around its circumference with calibration marks numbered from 0 to 100. These marks are so spaced that the distance between each mark represents a sampler valve movement of .001 of an inch. An index mark 33a (Fig. V) is located on the front coupling member 21 so that it can be conveniently read against the calibration marks on ring 33. Then the number on the indicator ring 33 opposite to the index mark indicates in thousandths of an inch the distance between the flat surface 3a of sampler valve 3 and the flat surface 4a on valve seat 4 when the valve rod head 29 engages the inner surface of wall 28a. Thus the amount of each individual sample may be varied to get a total composite sample of the volume required. A hand screw 35 is provided so that when a setting of the coupling sleeve 23 is made in the position desired, the hand screw 35 may be tightened to hold the adjustment in place. The indicator ring 33 is movable on the coupling sleeve 23 and can be moved if adjustment is necessary to match the zero point on the indicator ring 33 with the index mark 33a on the front coupling member 21. This adjustment is originally made at the factory. Readjustment will be required only in the event that a new valve rod 11 or plunger 31 is installed. When the zero mark on the properly adjusted indicator ring 33 is in line with the index mark 33a no sample should be taken if the sampler is operated. A small movement of the coupling sleeve 23, indicated by a low reading on the indicator ring 33 will produce a small sample. This test can be used to determine proper adjustment of the indicator ring 33. Felt dust rings 36 are placed between the coupling sleeve 23 and front coupling member 21 and rear coupling member 22 so as to prevent foreign material from getting into the screw threads of the adjustment mechanism. A reasonably heavy coil spring 37 is inserted between the front coupling member 21 and the rear coupling member 22 to maintain a slight pressure on the coupling threads 21a and 22a so as to insure against any backlash in the thread which would cause irregularity of adjustment.

The assembly next described is the reciprocating and plunger mechanism used to actuate the sampler valve with the desirable snap action. It is important to note in this construction that neither the plunger or hammer 31 nor the valve rod 11 form an integral part of the valve. A somewhat severe impact is imparted to the valve 35 which is relatively light and does not develop any great momentum. Thus repeated operation of the valve does not cause the wear and strain on the valve that would be occasioned if the valve rod 11, for instance, also served as one part of the valve.

Essentially this mechanism consists of a Scotch yoke arrangement for converting the rotary motion of the meter drive into reciprocating motion required for the snap action of the valve. The power is supplied from the meter through a rate control gearing and a hexagonal drive shaft covered by a flexible tubing dust cover to keep out foreign material. The connection between this driving mechanism which is not shown on the drawings and the mechanism shown in the drawings is made by a universal joint 38 through which is transmitted the power from the aforesaid drive shaft, not shown. Connected to the upper end of universal joint 38, a short drive shaft terminating in a yoke wheel driving head 39 extends upward through oil seal 40, which fits into the lower extension of the yoke wheel housing casing 41. This oil seal 40 prevents the escape of the oil used to lubricate the mechanism. A lug 41a on the yoke driving head 39 engages, during part of its revolution, a downwardly protruding section 42 of the lower end of yoke or fly wheel 42a which revolves in a ball bearing 43 pressed within the yoke wheel housing casing 41. The rotating yoke or fly wheel 42a draws the plunger 31 back against the power of a compression power spring 44 surrounding plunger 31 and resiliently urging it towards the valve rod, by the action of the yoke 45 (Figures I and IV) which is in the form of a slotted bar riding on a ball bearing 46 on a vertical pin 47 placed off center in the yoke wheel 42a. The ends of the yoke 45 are guided by members 47a and 47b in the housing casing 41 as best shown in Figure IV so that the rotating motion of the yoke wheel 42a is converted into the reciprocating motion of the yoke 45. As the lug 41a on the yoke driver head 39 engages the protruding section 42 of the lower extension of the yoke wheel 42a the plunger or hammer 31, attached to the yoke bar 45 by a screwed connection 48, is drawn back against power spring 44, and power is stored in said spring. When the yoke wheel pin 47 passes over dead center in relation to the axis of the plunger at the opposite position from that shown in Figure IV, the power accumulated in power spring 44 is released and causes the yoke wheel 42a to continue to rotate and the section 42 (Fig. II) to advance in free action away from the lug 41a on the yoke wheel driver 39, the section 42 and the lug 41a thus forming a lost motion connection. Thus the stored energy in power spring 44 causes the plunger or hammer 31 to move forward to strike the enlarged end 29 of the valve rod 11 with sufficient force to snap open the valve 3. As this action takes place, it is necessary that plunger 31 should not obstruct valve rod 11 as the valve 3 closes. To accomplish this purpose, advantage is taken of the fact that the kinetic energy of the yoke wheel 42a, the yoke 45 and the plunger 31 developed during the rapid forward action caused by release of energy in the power spring 44, tends to continue this motion so that the yoke wheel 42a, acting as a flywheel, revolves on past forward dead center (the position shown in Figure IV) and by this continuing motion draws plunger 31 back against the pressure of power spring 44. To maintain this desired position against any counter pressure of power spring 44, a one way ball clutch 49 (Figs. I and III) is installed in yoke wheel housing casing 41 around the lower extension of yoke wheel 42a. This one way clutch prevents yoke wheel 42a from reversing its direction of rotation and thus the plunger 31 is held out of the way of valve rod 11 as the valve resumes its closed position due to the pressure of the valve spring 6. As the yoke wheel 42a is held in this position, the yoke wheel driver 39 catches up with it and the cycle starts over again. The reciprocating plunger assembly is held in position in the adjustment assembly by inserting the forward end of yoke wheel housing casing 41 into bushing 27 and holding it in place with two set screws, one shown at 50. This forward end has an elongated bore which supports and guides the plunger 31. Casing 41 forms a support for the drive means for the plunger 31 and also for the plunger itself. A tubular casing 51 is attached to the lower end of yoke wheel housing casing 41 by screws, one shown at 52. A flexible tubing dust cover 53, used to protect the power transmitting linkage from the meter, fits into the lower end of the tubular casing 51. The meter, reduction gear box, and register, as shown and described in our aforementioned application 538,917 are used as a power source and indicator of the total volume of fluid from which the sample was extracted.

It will be noted that the plunger tube 26 will move axially with respect to the front coupling member as the sleeve 23 is rotated, since the tube 26 is clamped to the rear coupling member for movement therewith. The plunger 31 is of such length that when the pin 47 is at the bottom dead center position shown in Figure 4 the impacting left end of the plunger 31 will just clear one face of the valve rod head 29 when the other face of the valve rod head is abutting against the inner surface of the front end 28a of the plunger tube 26. Since the stroke of the plunger 31 is much greater than that of valve rod 11 and valve 3, there will be a wide gap between plunger 31 and the valve rod head 29 when the pin 47 on the yoke wheel 42a is at top dead center, and the plunger 31 is fully retracted. On the impacting stroke therefore, the plunger 31 and associate moving parts will have gained their maximum kinetic energy before the plunger or hammer 31 strikes the valve rod head 29.

Thus it will be noted that when the unit is properly assembled, the plunger or hammer in its advanced position as it will be when the yoke wheel 42a is in the position of Figure IV, just barely clears the valve rod head 29 and there is no space between the valve rod head and the inside of the front end wall 28a of the plunger tube 26. The other end of valve rod 11 is seated in and touches valve 3 but without sufficient force to cause said valve to open against spring 6. This initial arrangement of the assembly is made with the threaded sleeve 23 set in the zero position with the index mark 33a indicating a zero position on the indicator ring 33. With this adjustment, no sample will be taken when the hammer 31 is actuated, since the valve rod 11 cannot move to the left. However, upon loosening the hand-screw 35 and rotating sleeve 33 so that there is a positive reading of index 33a upon the ring 33 the wall 28a is moved to the left so that there is a clearance or space 39 between valve rod head 29 and the wall 28a, and this clearance or distance is the amount that the valve will open when the hammer 31 is actuated. The force of hammer 31 is sufficient to move the valve rod head 29 to the end of its stroke against wall 28a and the kinetic energy of the rotating yoke wheel 42a and associated parts is sufficient to move the hammer 31 out of the way before the spring 6 returns valve 3 towards its seat, as described before.

The sampler described and illustrated by way of example in the drawings, is simple, relatively inexpensive to manufacture, and has a small number of operating parts. The hammer blow is sudden and positive and the force of the blow is applied in a linear direction. The micrometric adjustment is simple and accurate in operation and cannot be disturbed unintentionally, and the entire sampler is an improvement over those previously known.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a device of the class described, a reciprocable element; a combined guide and stop means for guiding and limiting the stroke of said element; a plunger for engaging a portion of said element and moving said portion towards said guide and stop means; guide means for said plunger, said guide means being rigidly connected to said guide and stop means; means for reciprocating said plunger through a fixed stroke; and means for adjusting the position of said guide and stop means, to vary the length of stroke imparted to said element by said plunger.

2. In a device of the class described, a body including a tubular element; guide means adjacent one end of said element; a movable member mounted in said guide means for rectilinear movement towards and away from the end of said tubular element; means resiliently urging said movable member into engagement with said tubular element; a reciprocable plunger; means for moving said plunger through strokes of equal length; a casing forming guide means for said plunger; a rod having one end supported and guided by said movable member; means rigidly secured to said casing and forming a combined guide and stop means for the other end of said rod, said rod protruding through said guide and stop means into the path of said reciprocable plunger and said movable member being provided with a socket in which the other end of said rod is loosely seated; means resiliently urging said rod towards its seat in said movable member; and means for adjusting the position of said tubular element with respect to said combined guide and stop means and said plunger, to vary the length of stroke imparted to said rod by said plunger.

3. In a sampler for extracting fluid samples from a fluid container or the like, a body including a tubular element; guide means adjacent one end of said element, a valve disc mounted in said guide means for rectilinear movement towards and away from the said one end of said tubular element, a valve seat on the said one end of said tubular element engageable by said valve disc; means resiliently urging said valve disc into engagement with said valve seat; a reciprocable plunger; means for operating said plunger through strokes of equal length in a direction towards and away from said valve disc; a casing forming guide means for said plunger; a rod having one end supported and guided by said valve disc, said disc having a recess to loosely receive one end of said rod; means resiliently urging said rod towards said recess; means rigidly secured to said casing and forming a combined guide and stop means for the other end of said rod to limit its movement towards said valve disc, said rod protruding past said guide and stop means into the path of said reciprocable plunger; means for adjusting the position of said valve disc with respect to said combined guide and stop means and said plunger to vary the length of stroke imparted to said rod and valve disc; said operating means for said plunger being operable to drive said plunger to impart a striking blow to said rod and remove the plunger from the path of said rod during the return movement of the rod.

4. In a sampling device having a valve and a reciprocable rod adapted to unseat said valve when moved in one direction, an actuating means for said valve and said rod comprising; means resiliently urging said rod in the other direction, a reciprocable hammer for striking said rod to move it in said one direction, resilient means urging said hammer in said one directon and toward said rod, a rotary drive means, a fly wheel, a driving connection between said fly wheel and said drive means operable to permit relative rotation of said fly wheel with respect to said drive means in one direction, means preventing rotation of said fly wheel in a direction opposite said drive means, and a driving connection between said fly wheel and said hammer to convert the rotary motion of said fly wheel to reciprocating motion of said hammer.

5. In a device of the class described, a reciprocable hammer, resilient means urging said hammer in a first direction, a rotary drive means operable to move said hammer in an opposite direction against the action of said resilient means, a fly wheel, a driving connection between said fly wheel and said drive means operable to permit relative rotation of said fly wheel with respect to said drive means in one direction, a device preventing rotation of said fly wheel in a direction opposite to said drive means, and a driving connection between said fly wheel and said hammer to convert the rotary motion of said fly wheel to reciprocating motion of said hammer, a reciprocable fluid control valve element movable from a closed to an open position, means urging said member toward closed position; and means positioning said valve element with respect to said reciprocable hammer for cooperation with said hammer when the hammer is near the end of its stroke in said first direction, to momentarily open said valve element against the action of the said means urging said valve toward closed position.

6. In a sampling device having a normally closed valve, and actuating means for periodically opening said valve comprising; a reciprocable rod engaging said valve, stop means for limiting the stroke of said rod, a hammer for imparting a striking blow to said rod to move said rod with a snap action, drive means to reciprocate said hammer through strokes of uniform length, a support for said hammer and said drive means movable toward and away from said rod, and common means for moving said stop means and said support with respect to said rod to vary the effective stroke of the hammer and thus vary the stroke of said rod and thereby the opening movement of said valve.

RUSSELL M. WATERS.
GEORGE E. BATCHELDER.

REFERENCES CITED

The following references are of record in the file of this patent:

UNITED STATES PATENTS

| Number | Name | Date |
|---|---|---|
| 725,700 | Graef | Apr. 21, 1903 |
| 968,437 | Wellman | Aug. 23, 1910 |
| 1,003,812 | Schultz | Sept. 19, 1911 |
| 1,343,407 | Rottel | June 15, 1920 |
| 1,798,082 | Grutzbach | Mar. 24, 1931 |
| 2,006,065 | Blake | June 25, 1935 |
| 2,017,470 | Miller | Oct. 15, 1935 |
| 2,041,694 | Buckley | May 26, 1936 |
| 2,298,845 | Schmied | Oct. 13, 1942 |
| 2,317,158 | Westover | Apr. 20, 1943 |